US009807408B2

(12) United States Patent
Maurice (10) Patent No.: US 9,807,408 B2
(45) Date of Patent: Oct. 31, 2017

(54) CONTROL MECHANISM FOR VIDEO OUTPUT (71) Applicant: ClearOne Communications Hong Kong Ltd., Causeway Bay Hong Kong (HK)

(72) Inventor: Oren J. Maurice, Yoqneam Moshava (IL)

(73) Assignee: ClearOne Communications Hong Kong Ltd., Hong Kong (HK)

(*) Notice: Subject to any disclaimer, the term of this patent is extended or adjusted under 35 U.S.C. 154(b) by 333 days.

(21) Appl. No.: 14/837,317

(22) Filed: Aug. 27, 2015

(65) Prior Publication Data
US 2016/0065889 A1 Mar. 3, 2016

Related U.S. Application Data (60) Provisional application No. 62/042,305, filed on Aug. 27, 2014.

(51) Int. Cl.
H04N 7/12 (2006.01)
H04N 19/44 (2014.01)
H04N 5/04 (2006.01)
H04N 19/42 (2014.01)

(52) U.S. Cl.
CPC ............. *H04N 19/44* (2014.11); *H04N 5/04* (2013.01); *H04N 19/42* (2014.11)

(58) Field of Classification Search
CPC ........... H04N 19/44; H04N 19/42; H04N 5/04
USPC .................................................. 375/240.26
See application file for complete search history.

(56) References Cited

U.S. PATENT DOCUMENTS

| 4,496,995 | A | | 1/1985 | Colles et al. |
| 5,740,278 | A | * | 4/1998 | Berger ................... H04N 19/00 375/240.15 |
| 6,137,804 | A | | 10/2000 | Allison et al. |
| 7,295,578 | B1 | | 11/2007 | Lyle et al. |
| 7,440,476 | B1 | | 10/2008 | Yeh |

(Continued)

OTHER PUBLICATIONS

STMicroelectronics, "STi5518 Single-Chip Set-Top Box Decoder with MP3 and Hard Disk Drive Support", Data Sheet; http://www.st.com, 2001, 294 pages.

*Primary Examiner* — Tung Vo
(74) *Attorney, Agent, or Firm* — Matthew J. Booth PLLC; Matthew J. Booth (57) ABSTRACT This disclosure describes a computer-implemented method for a control mechanism for video output. Additionally provided is a video stream that is generated from the video source and encoded by the video encoder, where the video stream further comprises one or more video frames with each video frame including a time stamp that includes timing and clocking information. Additionally provided is a video display apparatus that includes a video display apparatus processor, video display apparatus memory, video decoder, and a video frame buffer, where the video decoder decodes the encoded video stream, and the video display apparatus generates a pixel clock. Additionally provided is a desired latency threshold for displaying a first video frame with respect to a second video frame that includes an upper threshold limit and a lower threshold limit. The disclosed method includes the following steps that control jitter in the displayed video stream.

20 Claims, 5 Drawing Sheets (56) References Cited

U.S. PATENT DOCUMENTS

| | | |
|---|---|---|
| 7,894,489 B2 | 2/2011 | Shenoi |
| 8,145,656 B2 | 3/2012 | Shatz et al. |
| 2003/0142058 A1 | 7/2003 | Maghielse |
| 2005/0185719 A1 | 8/2005 | Hannuksela |
| 2006/0034301 A1 | 2/2006 | Anderson et al. |
| 2006/0125835 A1 | 6/2006 | Sha et al. |
| 2008/0172708 A1 | 7/2008 | Perry et al. |
| 2009/0024767 A1 | 1/2009 | Matsuda |
| 2009/0044079 A1* | 2/2009 | de Lind Van Wijngaarden ......... H04L 1/0009 714/774 |
| 2011/0043694 A1 | 2/2011 | Izuno et al. |
| 2011/0055441 A1* | 3/2011 | Uchiyama ............. H04N 19/46 710/68 |
| 2012/0296658 A1* | 11/2012 | Smyth .................... G10L 19/22 704/500 |
| 2016/0066000 A1 | 3/2016 | Cunningham et al. |

* cited by examiner

CONTROL MECHANISM FOR VIDEO OUTPUT

CROSS REFERENCE TO RELATED APPLICATIONS

This application claims priority and the benefits of the earlier filed Provisional Application U.S. AN 62/042,305, filed Aug. 27, 2014, which is incorporated by reference for all purposes into this specification.

TECHNICAL FIELD

This disclosure relates to video output. More specifically, this disclosure relates to a control mechanism for video output to control jitter between video frames.

BACKGROUND ART

When using a video output card (such as an HDMI card), where software control over parameters that contribute to the output video frame rate is available, and given that frames to be displayed are presented to the software along with accurate timestamps when they are to be presented through the HDMI output connector (this also applies also to other types of video display hardware such as DVI, VGA, Display Port etc.), a method is needed that will control these exposed controlling parameters, minimizing the error between the desired presentation timestamp given with every frame, and its actual presentation time, as well as making sure that as long as the deviation in timestamps is within given limits, no frame will be dropped or doubled when sent out via the output port. In case of a real-time stream, the method should also contributes to a minimal latency for the end-to-end solution.

Figure 2:
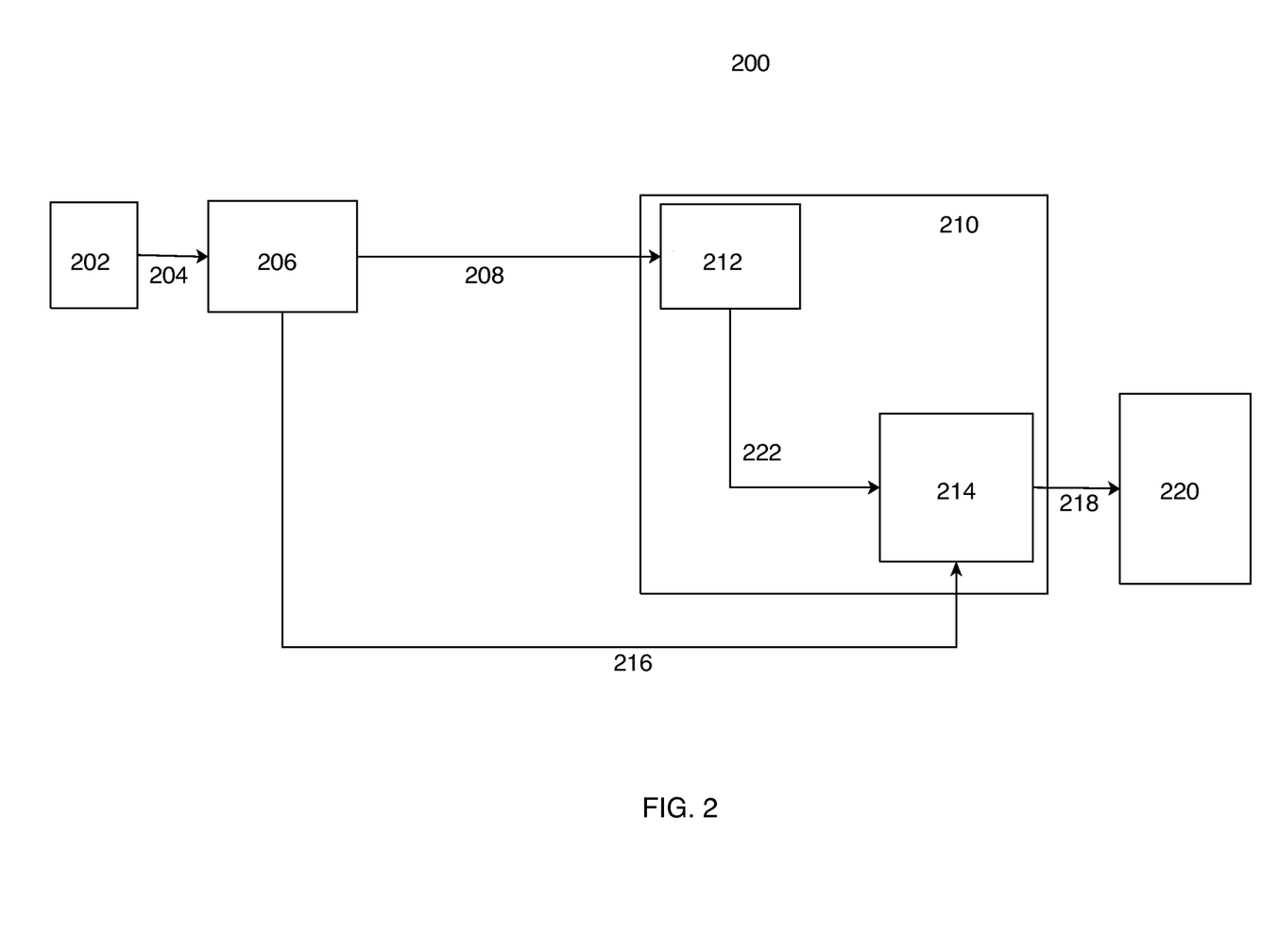
FIG. 2 illustrates a system that uses a separate Genlock signal with a hardware distribution scheme.

There are no similar control mechanisms as described above that are implemented in software. Hardware implementations such as illustrated in FIG. 2 receive a genlock signal through a distribution method separate from the media distribution mechanism, which makes this technique unsuitable for long-distance distribution, or when using existing networks which may be bandwidth or reliability limited.

The disclosed invention requires no hardware genlock signal distribution network, and allows frame-accurate, low latency distribution of video over sub-optimal networks. In addition, the disclosed invention allows for lower cost solutions (no need to implement a gen-lock distribution network, no need to upgrade existing networks to avoid any errors), over greater distances (where genlock networks are impractical), and simplifies the installation.

This application is related to U.S. application Ser. No. 14/837,321, entitled: A METHOD FOR VIDEO SYNCHRONIZATION IN VIDEO DISTRIBUTION SYSTEMS, filed 27 Aug. 2015, which is incorporated by reference for all purposes into this specification.

SUMMARY OF INVENTION

This disclosure describes a computer-implemented method for a control mechanism for video output that uses a video display apparatus connected to a video display device. The disclosed method includes providing a video stream that is generated from the video source and encoded by the video encoder, where the video stream further comprises one or more video frames with each video frame including a time stamp that includes timing and clocking information. The disclosed method further includes providing a video display apparatus that includes a video display apparatus processor, video display apparatus memory, video decoder, and a video frame buffer, where the video decoder decodes the encoded video stream, and the video display apparatus generates a pixel clock. In addition, the disclosed method includes providing a desired latency threshold for displaying a first video frame with respect to a second video frame that includes an upper threshold limit and a lower threshold limit to control jitter in the displayed video stream. The disclosed method includes the following steps that are executed on the video display apparatus processor:

receiving the video frames and storing the video frames in the video frame buffer;

retrieving the first video frame's start time and the second video frame's start time from the video frame buffer;

calculating a time delta from the designated start time for the first video frame and the second video frame calculated from the timing and clocking information from the video encoder, the first and second video frame's timestamp, the difference between the clock of the video encoder and the video decoder, and the desired latency;

comparing the time delta to the desired latency and determining whether the frame starts between the first video frame and the second video frame has decreased or stayed the same, and if this condition is met, then the pixel clock is not changed;

determining whether the frame starts between the first video frame and the second video frame has increased, if so, then has enough time passed since the last correction of the said pixel clock, and if no, then said pixel clock is not changed;

if a sufficient amount of time has passed from the last correction of the pixel clock, determining whether the first video frame started displaying before or after its calculated display time;

if the video frame started late, determining whether the pixel clock can increase before reaching said upper threshold limit, if no, then the pixel clock is not changed, or if yes, then the pixel clock is increased by a single quantum;

if the first video frame started early, determining whether the pixel clock can decrease another step before reaching the lower threshold limit, if no, then the pixel clock is not changed, or if yes, then the pixel clock is decrease by a single quantum; and transmitting the first video frame and the second video frame to the video display device.

The disclosed method further includes providing a host device that includes a host processor and host memory wherein the video display apparatus is coupled to the host device. The disclosed method additionally includes having the desired latency threshold be user adjustable. And, the disclosed method further includes the video frame buffer hold approximately 1 second of said video frames. The disclosed method further includes the video frame buffer functioning as a sliding window to negate momentary jitter in the displayed video stream.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

This disclosure describes a computer-implemented method for a control mechanism for video output that uses a video display apparatus connected to a video display device. This disclosure describes numerous specific details in order to provide a thorough understanding of the present invention. One skilled in the art will appreciate that one may practice the present invention without these specific details. Additionally, this disclosure does not describe some well known items in detail in order not to obscure the present invention.

In various embodiments of the present disclosure, definitions of one or more terms used in the document are provided below.

A "Video Source" is used in the present disclosure in the context of its broadest definition. The video source may refer to one or more computing devices capable of establishing a communication channel for providing digital video signals in a communication session. Examples of the computing devices may comprise, but are not limited to, a desktop PC, a personal digital assistant (PDA), a server, a mainframe computer, a mobile computing device (e.g., mobile phones, laptops, tablets, etc.), an internet appliance (e.g., gateway, router, set-top box, video digital signage player, etc.), and calling devices (e.g., an internet phone, video telephone, etc.). The video source may be based on or run a variety of operating system platforms such as Microsoft Windows, Linux, Android, and so on.

A "Video Display Device" is used in the present disclosure in the context of its broadest definition. The target device may refer to a variety of computing devices, such as those mentioned above, being integrated or associated with one or more video displays including, but not limited to, monitors and projectors.

A "Video Frame Rate" is used in the present disclosure in the context of its broadest definition. The video frame rate may refer to the number of video frames outputted per second. The video frame rate may be expressed in Hertz (Hz).

A "Refresh Rate" is used in the present disclosure in the context of its broadest definition. The refresh rate may refer to the number of times in a second that a display updates its screen with a video frame. The refresh rate may be expressed in Hertz (Hz).

A "Vertical Frequency" or "Vsync" is used in the present disclosure in the context of its broadest definition. The vertical frequency may refer to the number of times per second at which each pixel of a video frame is drawn from top to bottom on a display screen. The vertical frequency may be expressed in Hertz (Hz).

A "Horizontal Frequency" or "Hsync" is used in the present disclosure in the context of its broadest definition. The horizontal frequency may refer to the number of times per second at which a single line of pixels of a video frame is drawn from left to right on a display screen. The horizontal frequency may be expressed in Hertz (Hz).

A "Master Clock" is used in the present disclosure in the context of its broadest definition. The master clock may refer to the clock of a video source that is distributed among all connected devices. The master clock may be expressed in 100 microsecond accuracy.

A "Horizontal Front Porch" is used in the present disclosure in the context of its broadest definition. The horizontal front porch may refer to the right border of a display screen.

A "Horizontal Back Porch" is used in the present disclosure in the context of its broadest definition. The horizontal back porch may refer to the left border of a display screen.

A "Vertical Back Porch" is used in the present disclosure in the context of its broadest definition. The vertical back porch may refer to the top border of a display screen.

A "Vertical Front Porch" is used in the present disclosure in the context of its broadest definition. The vertical front porch may refer to the bottom border of a display screen.

A "Pixel-clock" is used in the present disclosure in the context of its broadest definition. When transmitting video over a cable (for example an HDMI cable from a source to a display device), there exists a constant-rate clock signal, the pixel clock, also sent over the cable, the "tick" of which signifies when valid data is transmitted over the cable (i.e., for example every up-swing of this clock signal means the parallel data-signal pins are holding the next valid value). These consecutive valid data-values are a pixel each, scanning usually from the top-left to bottom-right. The pixel clock-rate divided by the amount of pixels on the screen (dictated by the screen's resolution, as well as the blanking sizes) dictates how many full frames are delivered per second top the display. The higher the pixel clock rate for a set resolution, the higher the rate of frames delivered to the display.

The numerous references in the disclosure to a control mechanism for video output are intended to cover any and/or all devices capable of reducing jitter in a video display device environment relevant to the applicable context, regardless of whether or not the same are specifically provided.

Embodiments are disclosed in the context of video display device capable of displaying a video stream comprising one or more video frames or images. Other embodiments may be applied in the context of other use cases (e.g., television, video surveillance systems, gaming consoles, etc.) involving display of video signals from one or more video sources onto a video display device, in which each of the video sources and the display are operating with independent clocks for video encoding and decoding.

Figure 1:
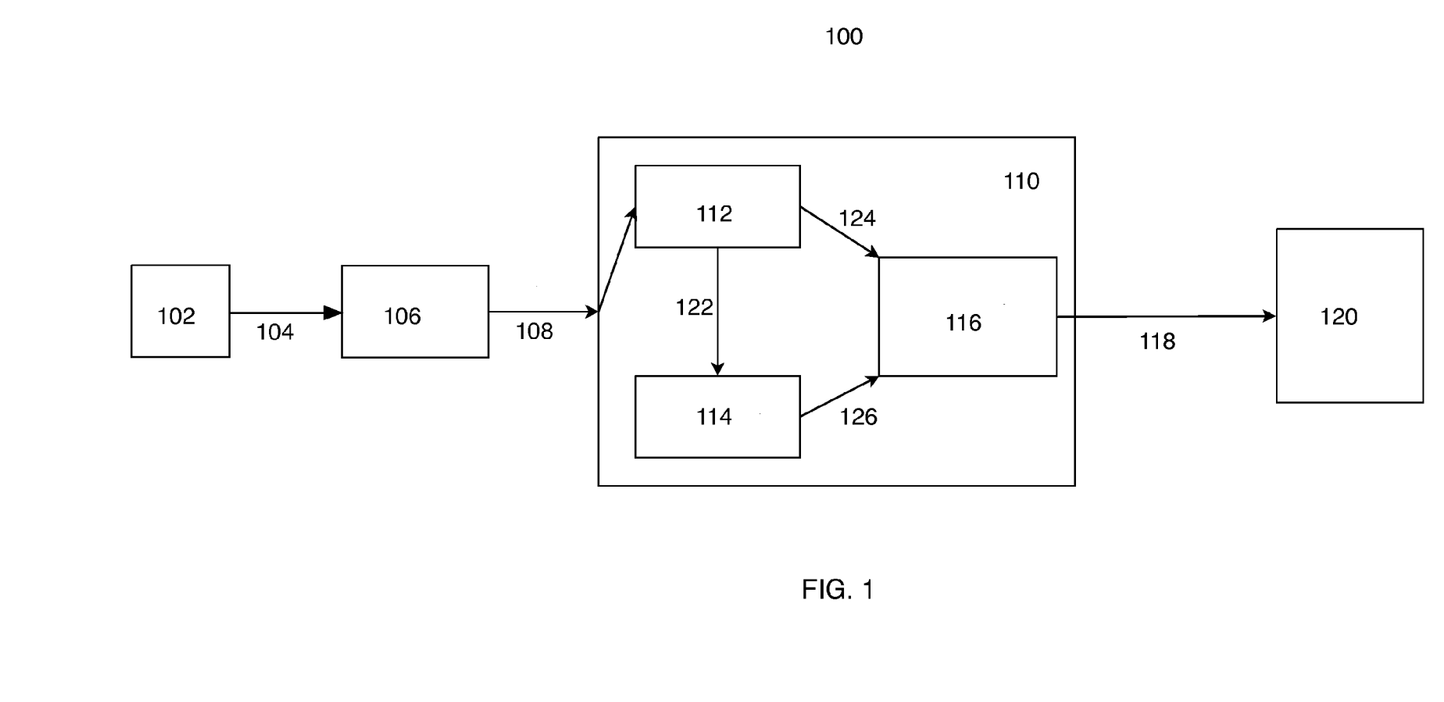
FIG. 1 illustrates a basic embodiment of the disclosed invention.

FIG. 1 illustrates a basic embodiment of the disclosed invention that discloses a minimal video stream system showing a video source, an encoder, a distribution network, and a video display apparatus that comprises in one embodiment a video card that couples to a host device and that responds to control signals as described in this disclosure, and a video display device.

One embodiment of the disclosed invention is illustrated with system 100 that includes a video source 102 that generates a video stream. The video stream includes one or more video frames with each video frame including a time stamp that also includes timing and clocking information. The video stream is transmitted to a video encoder 106 by a video display protocol 104 such as HDMI. The video encoder encodes the video stream into one or more data streams such as in one embodiment, H.264 video. The video encoder 106 also transmits the encoded data stream over network 108, which can include a LAN or WAN such as the internet. Other embodiments of the disclosed invention may use other types of data streams and networking protocols. The video data stream is eventually received by a video display apparatus 110, which in one embodiment is the Crystal Card video display output card made by ClearOne. The video display apparatus may include a processor (not shown), memory (not shown), video stream decoder 114, a video frame buffer (not shown), and a video output module 116. The video display adapter also includes a networking module 112 that receives the encoded video stream from the network 108. In one embodiment, the encoded video stream 122 is then transmitted to the video stream decoder 114. The networking module 112 may transmit the video stream timing information 124 to the video output module 116. And, the video stream decoder 114 transmits decoded video frames 126 to the video output module 116. Another embodiment may include having a single module that incorporates the functionality of both the video stream decoder 114 and the networking module 112. The decoded video frames are sent from the video output module through a video display protocol 118 such as HDMI to a video display device 120.

Another embodiment of the disclosed invention includes a host device (not shown), such as a computer. In a one embodiment, the video display apparatus 110 is coupled to the host device, and in turn the video display apparatus 110 may be coupled to the video display device 120. The host device includes a central processing unit (CPU) such as host processor and a host memory. The host device may receive the encoded video stream from the video source 102 and the video stream encoder 106 from network 108 and transfer it the video card such as video display apparatus 110.

The video display apparatus 110 may be connected to the host device or host computer via a PCIe (Peripheral Component Interconnect Express) bus (not shown). The video display apparatus 110 may process and manipulate the video signal generated and or received from the host device. In addition, the video display apparatus 110 may represent any of a wide variety of devices, such as a video adapter, graphic add-in-boards, and the like, which provides video output and video frame rate synchronization as described in this disclosure.

The host device may refer to a variety of computing devices known in the art, related art, or developed later including video player (e.g., a Blu-ray disc player), an imaging device (e.g., camera, camcorders, etc.), a digital signage player, a set-top box, a smart television, a desktop personal computer (PC), a mobile computing device (e.g., a personal digital assistant (PDA), a notebook, a laptop, a tablet, a mobile phone, etc.), a video calling device (e.g., a video phone, an internet phone, etc.), or any other device, component, object or system having any combination of similar devices capable of receiving and rendering video data signals based on any of a variety of known, related art, or later developed video codec standards including H.264, H.265, MPEG1, MPEG2, and HDMI. The host device may be based on or run a variety of operating system platforms such as Microsoft Windows, Linux, Android, Mac OS X, Apple iOS, and so on.

The video display apparatus 110 may be implemented as a single physical device (e.g., a computing device, a processor or an electronic storage device) or a combination of multiple physical devices that are operatively connected or networked together such as a video card included in a host computer. The video display apparatus 110 may be implemented in hardware or a suitable combination of hardware and software. In one embodiment, the video display apparatus 110 may be a hardware device including one or more processors, memory, a video decoder, a video frame buffer, a networking module, and a video output module. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processor(s) (not shown). The processor(s) may include, for example, microprocessors, microcomputers, microcontrollers, digital signal processors, central processing units, state machines, logic circuits, and/or any devices that manipulate signals based on operational instructions.

In some embodiments, the video display apparatus 110 may include, in whole or in part, a software application working alone or in conjunction with one or more hardware resources. Such software applications may be executed by the processor(s) on different hardware platforms or emulated in a virtual environment. Aspects of the video display apparatus 110 may leverage known, related art, or later developed off-the-shelf software. Other embodiments may comprise the video display apparatus 110 being integrated or in communication with a mobile switching center, network gateway system, Internet access node, application server, IMS core, service node, or some other communication systems, including any combination thereof.

Given an video display apparatus or video card, where software control over parameters that contribute to the output frame rate is available, and given that the video frames to be displayed are presented to the software along with accurate timestamps when they are to be presented through the video output connector (applies to HDMI, DVI, VGA, Display Port etc.), a control mechanism for video output as described in this disclosure is needed that will control these exposed controlling parameters, minimizing the error between the desired presentation timestamp given with every frame, and its actual presentation time, as well as making sure that as long as the deviation in timestamps is within given limits, no frame will be dropped or doubled when sent out via the port. In case of a real time video stream, the control mechanism also contributes to a minimal latency for the end-to-end solution.

The control mechanism as described in this disclosure relies on keeping a short video frame buffer (in one embodiment, up to one second's worth of frames), each video frame containing the time-delta between the time the frame was supposed to be displayed, and the time it was displayed. The video frame buffer functions as a sliding window, the reason for its existence and size mostly to negate momentary jitter in the timing values.

Every time a video frame is about to be displayed, a time delta between its desired timestamp and its expected display time is generated by the control mechanism, and is pushed into the top of the video frame buffer, removing the oldest value in the process. The video frame buffer is then cut into two halves, and the values in each half are summed (after obtaining the absolute value for each item). If the newer half's sum is greater than the older half's sum, the time delta is assumed to be growing (i.e. the display time is increasingly off-target). In such a case, if the time delta is bigger than a specific tolerance or a desired latency (said tolerance/latency being much shorter than a video frame's worth of time, and used to avoid endless small changes up and down), a selected parameter, the pixel clock, is tweaked by one notch towards correcting the drift (if the frames are displayed early, the output speed is tweaked down, otherwise, it is tweaked up).

After such a tweak, a blackout period starts, preventing the disclosed invention from performing another change for a pre-determined amount of time, in order to accommodate certain screens' need for a period of stability, and to prevent them from losing sync.

In case a video frame is skipped or doubled, the video frame buffer is flushed, and a blackout period is enacted, to avoid knee-jerk reactions typical in such cases.

The parameters that could be tweaked are the pixel clock, as well as horizontal and vertical porch sizes and sync period sizes.

Without the control mechanism for video output as described in this disclosure, the video frames coming into the system 100 and leaving it are un-synchronized. The incoming (over Ethernet for example) and outgoing (over HDMI for example) video frame rates are supposed to be very close, but they're not identical, and not phase matched. This could cause two undesirable side effects:
  a. Given the phase mismatch, a video frame from the input may arrive up to almost a frame's time before it is delivered downstream to the output, causing additional latency.
  b. Given that during a time period the input may deliver a different number of frames from the number emitted by the output (given that the input and output clocks are not running at a precisely identical rate), the output may be forced to either deliver the same frame multiple times (when the input has delivered no new frame and all buffered frames have been sent already), or skip input frames (i.e., not send these frames to the output at all, because too many input frames have arrived and buffered, and buffering anymore is either impossible or will result in high latency). Either skipping or doubling a frame will cause the output video to appear to "jump", which is easy to detect when the content is of the high-but-smooth motion variety (such as a football match).

FIG. 2 illustrates a scheme that uses a separate Genlock signal with a hardware distribution scheme to reduce jitter in the output video. System 200 includes a video source 202 that generates a video stream. The video stream is transmitted to a video encoder 206 by a video display protocol 204. The video encoder encodes the video stream into one or more data streams. The video encoder 206 also transmits the encoded data stream over network 208. In addition, video encoder 206 sends a separate timing signal over a separate, dedicated cable or hard wire mechanism 216 to a video display apparatus 210. The video data stream is eventually received by a video display apparatus 210 that includes the video stream decoder 214 and video output module 216. The video decoder 212 transmits the decoded video stream 222 to the video output module 214. The video output module 214 uses the decoded video stream 222 and the timing information from the genlock cable 216 to re-synchronize the video stream. And, the decoded video frames are sent from the video output module 214 through a video display protocol 218 to a video display device 220.

Figure 3A:
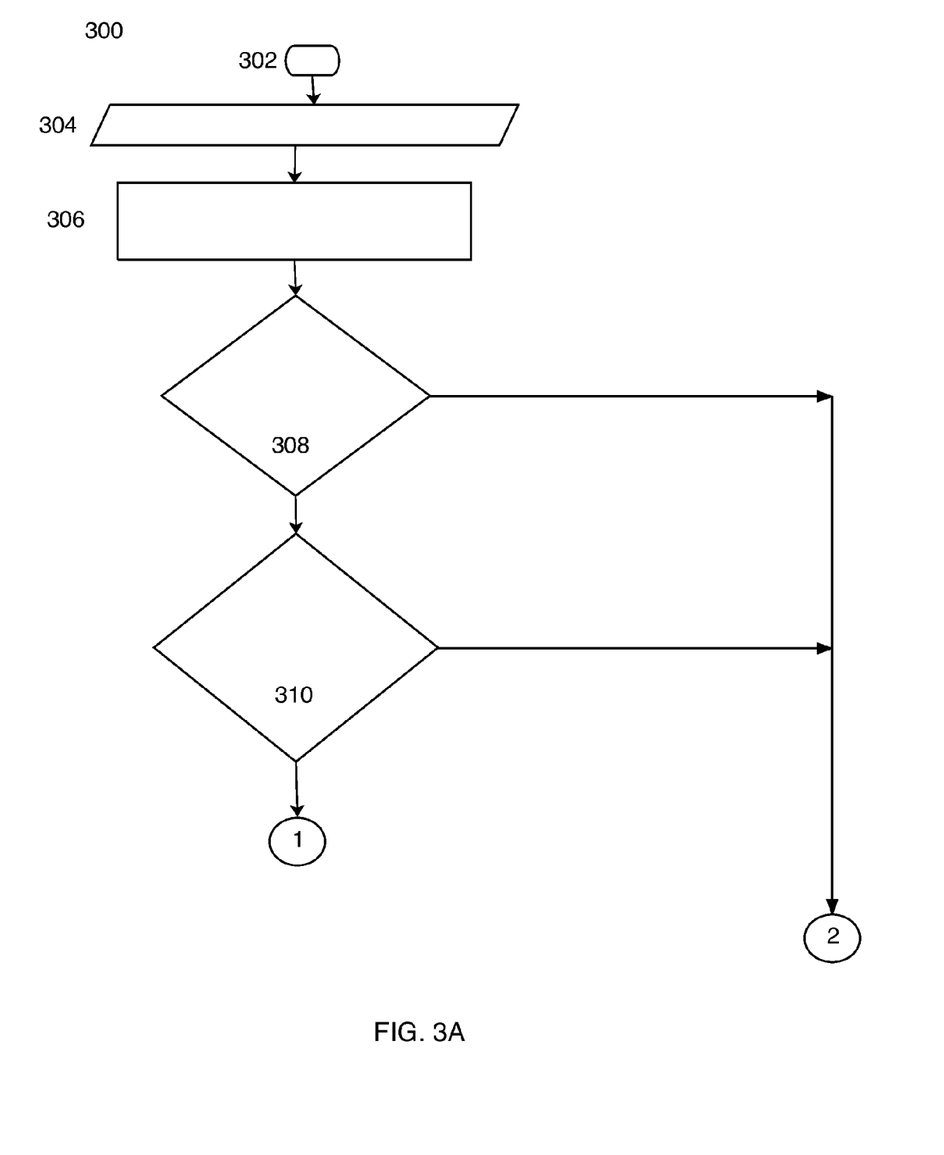
FIGS. 3A and 3B discloses a flowchart of one embodiment of the disclosed invention.
Figure 3B:
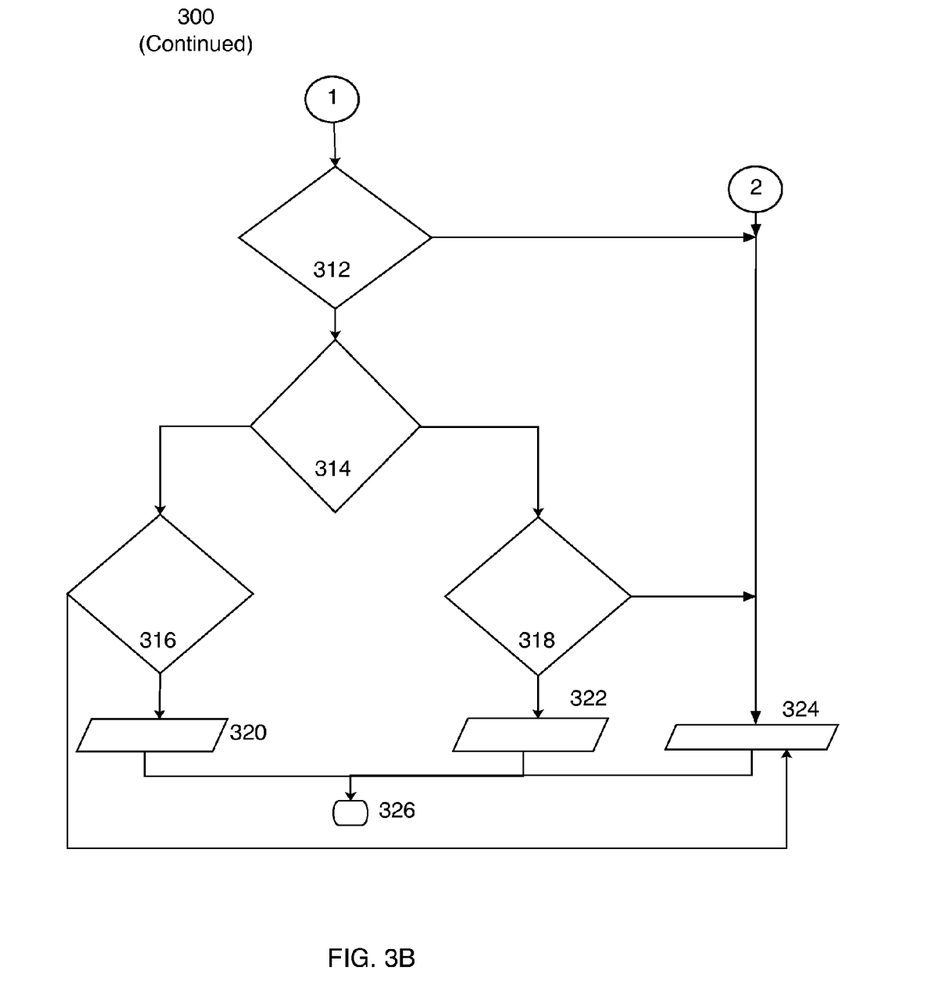

FIGS. 3A and 3B discloses a flowchart of one embodiment of the control mechanism for video output 300. The system 300 starts at 302 and waits for and retrieves the last video frame's start time 304 from the video display apparatus 110. This start time is obtainable after Vsync. Next, the system 300 calculates the designated start time for the same time frame 308. This time frame is based on timing information sent over the network 108 that comprises the video frame's timestamp, the delta between local clock and video encoder's clock, and the desired latency. The desired latency threshold may be user adjustable. The system 300 then checks to see whether the video frame starts differ 308 by more than the action threshold, which may be user adjustable. If no, then the pixel clock is unchanged 324. If yes, then the system 300 examines whether the frame starts difference 310 decreases or increases since the previous video frame. If the frame starts difference decreases and or stayed the same, then the pixel clock is unchanged 324. If the frame start time increased, then the system 300 determines 312 whether enough time has passed since the last correction (per the settings). If no, then leave the pixel clock unchanged 324. If yes, then the system 300 determines 314 whether the frame start is displaying before or after its calculated display time.

If the frame started to early 314, then the system 300 determines 318 whether the pixel clock can decrease another step before reaching the lower limit. If this determination is no, then the pixel clock is unchanged 324. If the determination 318 is yes, then the pixel clock is decreased by a single quantum 322. The system 300 then goes to the next video frame 326. The lower limit may be user adjustable.

If the frame started to late 314, then the system determines 316 whether the pixel clock can increase another step before reaching the upper limit. If the determination is no, then the pixel clock is unchanged 324. If the determination is yes, then the pixel clock is increased by a single quantum 320. The upper limit may be user adjustable. The system 300 then goes to the next video frame 326

Figure 4:
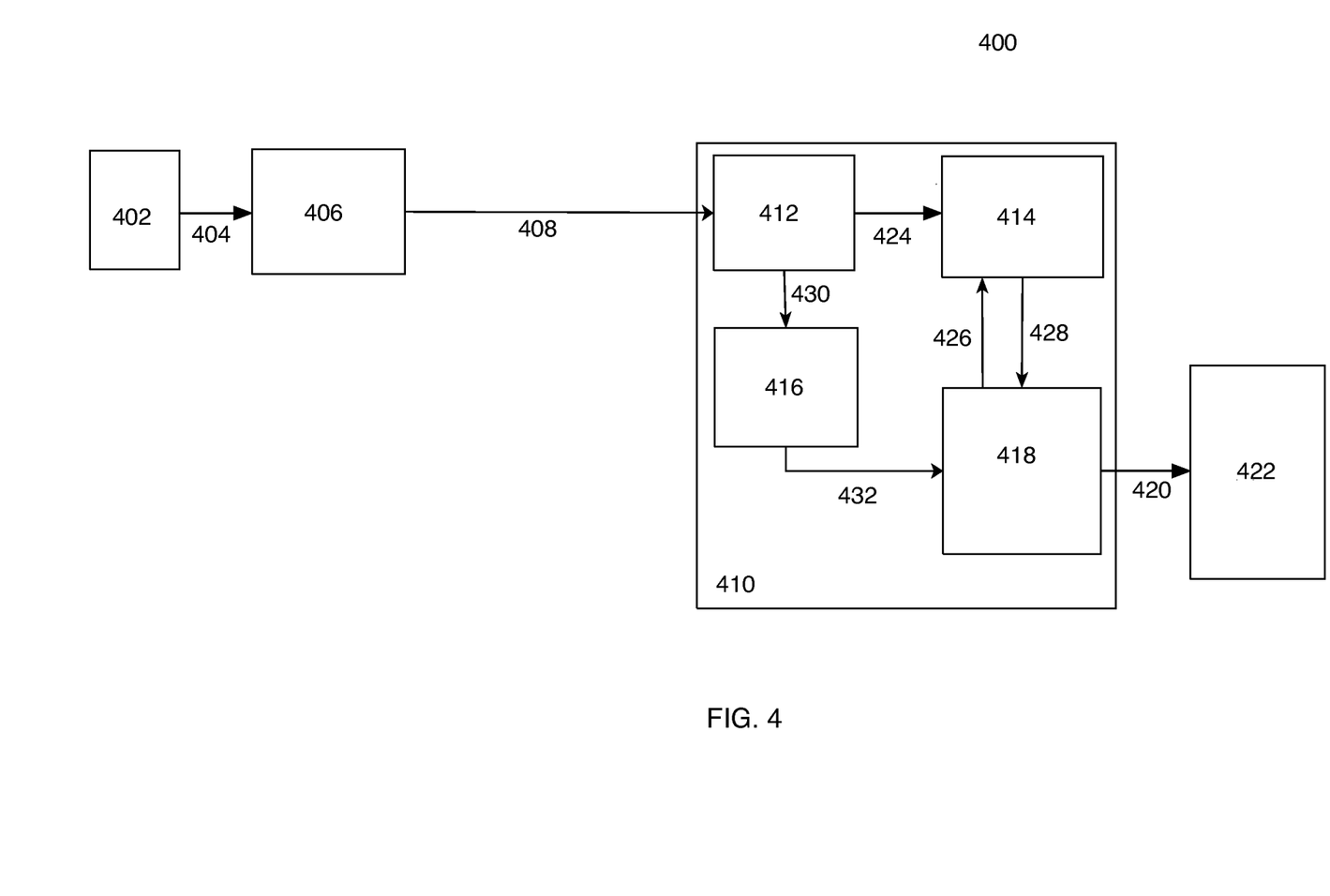
FIG. 4 illustrates another embodiment of the disclosed invention.

FIG. 4 illustrates another embodiment of the disclosed invention that shows where the video frame buffer that holds the time deltas between the time the frame was supposed to be displayed and the time it was actually displayed. This illustration shows that the oldest value in the buffer is removed and the newest value is added. This illustration shows how the buffer is divided into two halves and that the values in each half are summed. System 400 includes a video source 402 that generates a video stream. The video stream is transmitted to a video encoder 406 by a video display protocol 404. The video encoder encodes the video stream into one or more data streams and transmits the encoded data stream over network 208. The video data stream is eventually received by a video display apparatus 410 that includes the network module 412, the video stream decoder 416, the embedded control mechanism 414 stored in a memory device, and video output module 418. The network module de-packs the encoded video stream 430 from the network format and transmits it to the video decoder 414. In addition, the network module sends the video stream timing data 424 to the control mechanism 414. The video decoder 416 transmits the decoded video frames to the video output module 418. The video output module 418 synchronizes the timing of the video frames with the control mechanism by transmitting and receiving timing control commands 428 and current timing information 426. The decoded and properly synchronized video frames are sent from the video output module 418 through a video display protocol 420 to a video display device 422.

To summarize, this disclosure describes a computer-implemented method for a control mechanism for video output that uses a video display apparatus connected to a video display device. The disclosed method includes providing a video stream that is generated from the video source and encoded by the video encoder, where the video stream further comprises one or more video frames with each video frame including a time stamp that includes timing and clocking information. The disclosed method further includes providing a video display apparatus that includes a video display apparatus processor, video display apparatus memory, video decoder, and a video frame buffer, where the video decoder decodes the encoded video stream, and the video display apparatus generates a pixel clock. In addition, the disclosed method includes providing a desired latency threshold for displaying a first video frame with respect to a second video frame that includes an upper threshold limit and a lower threshold limit to control jitter in the displayed video stream. The disclosed method includes the following steps that are executed on the video display apparatus processor:

receiving the video frames and storing the video frames in the video frame buffer;

retrieving the first video frame's start time and the second video frame's start time from the video frame buffer;

calculating a time delta from the designated start time for the first video frame and the second video frame calculated from the timing and clocking information from the video encoder, the first and second video frame's timestamp, the difference between the clock of the video encoder and the video decoder, and the desired latency;

comparing the time delta to the desired latency and determining whether the frame starts between the first video frame and the second video frame has decreased or stayed the same, and if this condition is met, then the pixel clock is not changed;

determining whether the frame starts between the first video frame and the second video frame has increased, if so, then has enough time passed since the last correction of the said pixel clock, and if no, then said pixel clock is not changed;

if a sufficient amount of time has passed from the last correction of the pixel clock, determining whether the first video frame started displaying before or after its calculated display time;

if the video frame started late, determining whether the pixel clock can increase before reaching said upper threshold limit, if no, then the pixel clock is not changed, or if yes, then the pixel clock is increased by a single quantum;

if the first video frame started early, determining whether the pixel clock can decrease another step before reaching the lower threshold limit, if no, then the pixel clock is not changed, or if yes, then the pixel clock is decrease by a single quantum; and transmitting the first video frame and the second video frame to the video display device.

The disclosed method further includes providing a host device that includes a host processor and host memory wherein the video display apparatus is coupled to the host device. The disclosed method additionally includes having the desired latency threshold be user adjustable. And, the disclosed method further includes the video frame buffer hold approximately 1 second of said video frames. The disclosed method further includes the video frame buffer functioning as a sliding window to negate momentary jitter in the displayed video stream.

Other embodiments of the present invention will be apparent to those skilled in the art after considering this disclosure or practicing the disclosed invention. The specification and examples above are exemplary only, with the true scope of the present invention being determined by the following claims.

I claim the following invention:

1. A computer-implemented method for a control mechanism for video output that uses a video display apparatus connected to a video display device, comprising:

providing a video stream that is generated from the video source and encoded by the video encoder, said video stream further comprises one or more video frames with each said video frame including a time stamp that includes timing and clocking information;

providing a video display apparatus that includes a video display apparatus processor, video display apparatus memory, video decoder, and a video frame buffer, said video decoder decodes the encoded video stream, and said video display apparatus generates a pixel clock;

providing a desired latency threshold for displaying a first said video frame with respect to a second said video frame that includes an upper threshold limit and a lower threshold limit to control jitter in the displayed video stream;

wherein the following steps are executed on said video display apparatus processor:

receiving said video frames and storing said video frames in said video frame buffer;

retrieving said first video frame's start time and said second video frame's start time from said video frame buffer;

calculating a time delta from the designated start time for said first video frame and said second video frame calculated from said timing and clocking information from said video encoder, said first and second video frame's timestamp, the difference between the clock of said video encoder and said video decoder, and said desired latency;

comparing said time delta to said desired latency and determining whether the frame starts between said first video frame and said second video frame has decreased or stayed the same, and if this condition is met, then said pixel clock is not changed;

determining whether the frame starts between said first video frame and said second video frame has increased, if so, then has enough time passed since the last correction of said pixel clock, and if no, then said pixel clock is not changed;

if a sufficient amount of time has passed from said last correction of said pixel clock, determining whether the said first video frame started displaying before or after its calculated display time;

if said first video frame started late, determining whether said pixel clock can increase before reaching said upper threshold limit, if no, then said pixel clock is not changed, or if yes, then said pixel clock is increased by a single quantum;

if said first video frame started early, determining whether said pixel clock can decrease another step before reaching said lower threshold limit, if no, then said pixel clock is not changed, or if yes, then said pixel clock is decrease by a single quantum;

transmitting said first video frame and said second video frame to the video display device.

2. The claim of claim 1 further comprising providing a host device that includes a host processor and host memory wherein said video display apparatus is coupled to said host device.

3. The claim of claim 1 wherein said desired latency threshold is user adjustable.

4. The claim of claim 1 wherein said video frame buffer holds approximately 1 second of said video frames.

5. The claim of claim 1 wherein said video frame buffer functions as a sliding window to negate momentary jitter in the displayed video stream.

6. A non-transitory program storage device readable by a computing device that tangibly embodies a program of instructions executable by the computing device to perform a computer-implemented method for a control mechanism for video output that uses a video display apparatus connected to a video display device, comprising:
  providing a video stream that is generated from the video source and encoded by the video encoder, said video stream further comprises one or more video frames with each said video frame including a time stamp that includes timing and clocking information;
  providing a video display apparatus that includes a video display apparatus processor, video display apparatus memory, video decoder, and a video frame buffer, said video decoder decodes the encoded video stream, and said video display apparatus generates a pixel clock;
  providing a desired latency threshold for displaying a first said video frame with respect to a second said video frame that includes an upper threshold limit and a lower threshold limit to control jitter in the displayed video stream;
  wherein the following steps are executed on said video display apparatus processor:
  receiving said video frames and storing said video frames in said video frame buffer;
  retrieving said first video frame's start time and said second video frame's start time from said video frame buffer;
  calculating a time delta from the designated start time for said first video frame and said second video frame calculated from said timing and clocking information from said video encoder, said first and second video frame's timestamp, the difference between the clock of said video encoder and said video decoder, and said desired latency;
  comparing said time delta to said desired latency and determining whether the frame starts between said first video frame and said second video frame has decreased or stayed the same, and if this condition is met, then said pixel clock is not changed;
  determining whether the frame starts between said first video frame and said second video frame has increased, if so, then has enough time passed since the last correction of said pixel clock, and if no, then said pixel clock is not changed;
  if a sufficient amount of time has passed from said last correction of said pixel clock, determining whether the said first video frame started displaying before or after its calculated display time;
  if said first video frame started late, determining whether said pixel clock can increase before reaching said upper threshold limit, if no, then said pixel clock is not changed, or if yes, then said pixel clock is increased by a single quantum;
  if said first video frame started early, determining whether said pixel clock can decrease another step before reaching said lower threshold limit, if no, then said pixel clock is not changed, or if yes, then said pixel clock is decrease by a single quantum;
  transmitting said first video frame and said second video frame to the video display device.

7. The claim of claim 6 further comprising providing a host device that includes a host processor and host memory wherein said video display apparatus is coupled to said host device.

8. The claim of claim 6 wherein said desired latency threshold is user adjustable.

9. The claim of claim 6 wherein said video frame buffer holds approximately 1 second of said video frames.

10. The claim of claim 6 wherein said video frame buffer functions as a sliding window to negate momentary jitter in the displayed video stream.

11. A system for a control mechanism for video output that uses a video display apparatus connected to a video display device, comprising:
  a video stream that is generated from the video source and encoded by the video encoder, said video stream further comprises one or more video frames with each said video frame including a time stamp that includes timing and clocking information;
  a video display apparatus that includes a video display apparatus processor, video display apparatus memory, video decoder, and a video frame buffer, said video decoder decodes the encoded video stream, and said video display apparatus generates a pixel clock;
  a desired latency threshold for displaying a first said video frame with respect to a second said video frame that includes an upper threshold limit and a lower threshold limit to control jitter in the displayed video stream;
  wherein the following steps are executed on said video display apparatus processor:
  receiving said video frames and storing said video frames in said video frame buffer;
  retrieving said first video frame's start time and said second video frame's start time from said video frame buffer;
  calculating a time delta from the designated start time for said first video frame and said second video frame calculated from said timing and clocking information from said video encoder, said first and second video frame's timestamp, the difference between the clock of said video encoder and said video decoder, and said desired latency;
  comparing said time delta to said desired latency and determining whether the frame starts between said first video frame and said second video frame has decreased or stayed the same, and if this condition is met, then said pixel clock is not changed;
  determining whether the frame starts between said first video frame and said second video frame has increased, if so, then has enough time passed since the last correction of said pixel clock, and if no, then said pixel clock is not changed;
  if a sufficient amount of time has passed from said last correction of said pixel clock, determining whether the said first video frame started displaying before or after its calculated display time;
  if said first video frame started late, determining whether said pixel clock can increase before reaching said upper threshold limit, if no, then said pixel clock is not changed, or if yes, then said pixel clock is increased by a single quantum;
  if said first video frame started early, determining whether said pixel clock can decrease another step before reaching said lower threshold limit, if no, then said pixel clock is not changed, or if yes, then said pixel clock is decrease by a single quantum;

transmitting said first video frame and said second video frame to the video display device.

12. The claim of claim 11 further comprising providing a host device that includes a host processor and host memory wherein said video display apparatus is coupled to said host device.

13. The claim of claim 11 wherein said desired latency threshold is user adjustable.

14. The claim of claim 11 wherein said video frame buffer holds approximately 1 second of said video frames.

15. The claim of claim 11 wherein said video frame buffer functions as a sliding window to negate momentary jitter in the displayed video stream.

16. A method to make a system for a control mechanism for video output that uses a video display apparatus connected to a video display device, comprising:
  providing a video stream that is generated from the video source and encoded by the video encoder, said video stream further comprises one or more video frames with each said video frame including a time stamp that includes timing and clocking information;
  providing a video display apparatus that includes a video display apparatus processor, video display apparatus memory, video decoder, and a video frame buffer, said video decoder decodes the encoded video stream, and said video display apparatus generates a pixel clock;
  providing a desired latency threshold for displaying a first said video frame with respect to a second said video frame that includes an upper threshold limit and a lower threshold limit to control jitter in the displayed video stream;
  wherein the following steps are executed on said video display apparatus processor:
  receiving said video frames and storing said video frames in said video frame buffer;
  retrieving said first video frame's start time and said second video frame's start time from said video frame buffer;
  calculating a time delta from the designated start time for said first video frame and said second video frame calculated from said timing and clocking information from said video encoder, said first and second video frame's timestamp, the difference between the clock of said video encoder and said video decoder, and said desired latency;
  comparing said time delta to said desired latency and determining whether the frame starts between said first video frame and said second video frame has decreased or stayed the same, and if this condition is met, then said pixel clock is not changed;
  determining whether the frame starts between said first video frame and said second video frame has increased, if so, then has enough time passed since the last correction of said pixel clock, and if no, then said pixel clock is not changed;
  if a sufficient amount of time has passed from said last correction of said pixel clock, determining whether the said first video frame started displaying before or after its calculated display time;
  if said first video frame started late, determining whether said pixel clock can increase before reaching said upper threshold limit, if no, then said pixel clock is not changed, or if yes, then said pixel clock is increased by a single quantum;
  if said first video frame started early, determining whether said pixel clock can decrease another step before reaching said lower threshold limit, if no, then said pixel clock is not changed, or if yes, then said pixel clock is decrease by a single quantum;
  transmitting said first video frame and said second video frame to the video display device.

17. The claim of claim 16 further comprising providing a host device that includes a host processor and host memory wherein said video display apparatus is coupled to said host device.

18. The claim of claim 16 wherein said desired latency threshold is user adjustable.

19. The claim of claim 16 wherein said video frame buffer holds approximately 1 second of said video frames.

20. The claim of claim 16 wherein said video frame buffer functions as a sliding window to negate momentary jitter in the displayed video stream.

* * * * *

UNITED STATES PATENT AND TRADEMARK OFFICE
CERTIFICATE OF CORRECTION

PATENT NO. : 9,807,408 B2
APPLICATION NO. : 14/837317
DATED : October 31, 2017
INVENTOR(S) : Oren Maurice Page 1 of 1

It is certified that error appears in the above-identified patent and that said Letters Patent is hereby corrected as shown below:

In Column 5, Line 36, delete "and or" and insert -- and/or --, therefor.

In Column 8, Lines 6-7, after "adjustable" insert -- . --.

In Column 8, Line 10, delete "and or" and insert -- and/or --, therefor.

In Column 8, Line 31, after "326" insert -- . --.

Signed and Sealed this
Nineteenth Day of December, 2017

Joseph Matal
*Performing the Functions and Duties of the
Under Secretary of Commerce for Intellectual Property and
Director of the United States Patent and Trademark Office*